United States Patent
Kayano et al.

(10) Patent No.: US 8,280,565 B2
(45) Date of Patent: Oct. 2, 2012

(54) DRIVE CONTROL APPARATUS FOR ELECTRIC CAR

(75) Inventors: Hiroyuki Kayano, Tokyo (JP); Tsuneyasu Kakizaki, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 467 days.

(21) Appl. No.: 12/161,072

(22) PCT Filed: Apr. 17, 2006

(86) PCT No.: PCT/JP2006/308047
§ 371 (c)(1),
(2), (4) Date: Apr. 23, 2010

(87) PCT Pub. No.: WO2007/122696
PCT Pub. Date: Nov. 1, 2007

(65) Prior Publication Data
US 2010/0292878 A1    Nov. 18, 2010

(51) Int. Cl.
*B60L 9/00*    (2006.01)
*B60L 11/00*   (2006.01)
*B60L 7/12*    (2006.01)

(52) U.S. Cl. .......................... 701/11; 701/74

(58) Field of Classification Search ................ None
See application file for complete search history.

(56) References Cited

U.S. PATENT DOCUMENTS

| | | | | |
|---|---|---|---|---|
| 5,657,229 A | * | 8/1997 | Naito et al. | 701/71 |
| 5,717,606 A | * | 2/1998 | Hara et al. | 701/44 |
| 6,256,570 B1 | * | 7/2001 | Weiberle et al. | 701/70 |
| 7,317,978 B2 | * | 1/2008 | Ashizawa et al. | 701/54 |
| 7,917,257 B2 | * | 3/2011 | Kumar | 701/19 |
| 7,962,261 B2 | * | 6/2011 | Bushko et al. | 701/37 |
| 2005/0065690 A1 | * | 3/2005 | Ashizawa et al. | 701/51 |
| 2008/0033613 A1 | * | 2/2008 | Tamaizumi et al. | 701/41 |

FOREIGN PATENT DOCUMENTS

| | | |
|---|---|---|
| JP | 61-231805 A | 10/1986 |
| JP | 61-258604 A | 11/1986 |
| JP | 2002-281606 A | 9/2002 |

OTHER PUBLICATIONS

Form PCT/ISA/210 (International Search Report) dated Jul. 18, 2006.

* cited by examiner

*Primary Examiner* — M. Thien
*Assistant Examiner* — Ariel Yu
(74) *Attorney, Agent, or Firm* — Buchanan Ingersoll & Rooney PC

(57) ABSTRACT

A drive control apparatus for an electric car as can correct a synchronizing frequency without employing beacons, is proposed. A wheel-diameter correction information output means includes wheel-diameter information calculation means for calculating wheel-diameter calculation information expressive of a wheel diameter of an electric car, on the basis of two-phase current information. The wheel-diameter correction information output means also includes selection output means. The selection output means selects a wheel-diameter data output WD1, the wheel-diameter calculation information WD2 based on the wheel-diameter calculation means, or wheel-diameter default information WD0, and it outputs wheel-diameter correction information WD. A synchronizing-frequency calculation means outputs synchronizing frequency information FM on the basis of axle rotational-frequency information FR and the wheel-diameter correction information WD.

4 Claims, 3 Drawing Sheets

DRIVE CONTROL APPARATUS FOR ELECTRIC CAR

TECHNICAL FIELD

This invention relates to a drive control apparatus for an electric car wherein a three-phase AC voltage is generated by a VVVF inverter (variable-voltage and variable-frequency inverter), and a linear induction motor is driven by the three-phase AC voltage.

BACKGROUND ART

In an electric car on which a linear induction motor of three phases is mounted, a VVVF inverter generates a three-phase AC voltage by DC power fed to the electric car, and the linear induction motor is driven by the three-phase AC voltage. This VVVF inverter is controlled by an inverter control unit, and it generates the three-phase AC voltage at a frequency obtained by adding or subtracting a slip frequency to or from the synchronizing frequency of the linear induction motor.

In general, the synchronizing frequency of the linear induction motor is calculated on the basis of the frequency of the output pulses of a pulse generator which is disposed on the predetermined axle of the electric car. However, when a wheel attached to the axle to have its rotational frequency detected, on which the pulse generator is disposed, has worn away, the wheel diameter of the wheel changes, a cycle per revolution of the wheel changes, and the frequency of the output pulses of the pulse generator changes, so that the synchronizing frequency needs to be corrected in accordance with the wheel diameter.

In general, the change of the wheel diameter attendant upon the wear of the wheel is coped with in such a way that wheel-diameter data means is disposed in the driver's cabin of the electric car, and that wheel diameter data measured in the routine inspection of the electric car is stored in the wheel-diameter data means. The wheel diameter data stored in the wheel-diameter data means is transmitted from the driver's cabin to the inverter control unit. In the inverter control unit, the synchronizing frequency is corrected using the transmitted wheel-diameter information. However, in a case where the wheel-diameter data means in the driver's cabin has gotten out of order, or where an error has developed in the transmission of the wheel diameter data to the inverter control unit, so that the wheel diameter data from the wheel-diameter data means cannot be normally received by the inverter control unit, the correction of the synchronizing frequency cannot be made.

JP61-231805A concerning a prior-art technique discloses an apparatus wherein the absolute velocity of an electric car is evaluated by employing beacons, and a synchronizing frequency is corrected on the basis of the absolute velocity of the electric car. The apparatus disclosed in the prior-art technique, however, needs to especially dispose the beacons, and an absolute velocity sensor corresponding to the beacons. The beacons need to be especially disposed in a plurality of places on the ground, and they require maintenance and inspection on the ground.

Patent Document 1: JP61-231805A

DISCLOSURE OF THE INVENTION

Problem that the Invention is to Solve

This invention proposes an improved drive control apparatus for an electric car as can correct a synchronizing frequency without using beacons.

Means for Solving the Problem

A drive control apparatus for an electric car according to the first viewpoint of this invention includes in the drive control apparatus for an electric car wherein a three-phase AC voltage is generated by a VVVF inverter, and a linear induction motor is driven by the three-phase AC voltage. The drive control apparatus includes; current detection means for outputting instantaneous value information of a three-phase AC current which flows from the VVVF inverter to the linear induction motor on the basis of the three-phase AC voltage; three-phase/two-phase conversion means for converting the instantaneous value information of the three-phase AC current into two-phase current information and outputting the two-phase current information; axle rotational-frequency information output means for outputting axle rotational-frequency information which represents a rotational frequency of an axle of the electric car; wheel-diameter correction information output means including wheel-diameter information calculation means for calculating wheel-diameter calculation information representing a wheel diameter of the electric car on the basis of the two-phase current information, and configured so as to be capable of outputting the wheel-diameter calculation information as wheel-diameter correction information; synchronizing-frequency calculation means for calculating synchronizing frequency information representing a synchronizing frequency of the linear induction motor on the basis of the axle rotational-frequency information and the wheel-diameter correction information; and vector calculation control means for outputting a control command for the VVVF inverter, on the basis of a torque command, the two-phase current information and the synchronizing frequency information.

A drive control apparatus for an electric car according to the second viewpoint of this invention includes in the drive control apparatus for an electric car wherein a three-phase AC voltage is generated by a VVVF inverter, and a linear induction motor is driven by the three-phase AC voltage. The drive control apparatus includes; current detection means for outputting instantaneous value information of a three-phase AC current which flows from the VVVF inverter to the linear induction motor on the basis of the three-phase AC voltage; three-phase/two-phase conversion means for converting the instantaneous value information of the three-phase AC current into two-phase current information and outputting the two-phase current information; axle rotational-frequency information output means for outputting axle rotational-frequency information which represents a rotational frequency of an axle of the electric car; wheel-diameter correction information output means including wheel-diameter information calculation means for calculating wheel-diameter calculation information representing a wheel diameter of the electric car on the basis of the two-phase current information, and configured so as to be capable of outputting the wheel-diameter calculation information as wheel-diameter correction information; synchronizing-frequency calculation means for calculating synchronizing frequency information representing a synchronizing frequency of the linear induction motor on the basis of the axle rotational-frequency information and the wheel-diameter correction information; and slip calculation control means for outputting a control command for the VVVF inverter, on the basis of a torque command, the instantaneous value information of the three-phase AC current and the synchronizing frequency information.

Advantage of the Invention

In the drive control apparatus for the electric car according to the first or second viewpoint of this invention, the wheel-diameter correction information output means includes the wheel-diameter information calculation means for calculating the wheel-diameter calculation information expressive of the wheel diameter of the electric car on the basis of the two-phase current information, and it is configured so as to be capable of outputting the wheel-diameter calculation information as the wheel-diameter correction information, so that the synchronizing frequency can be corrected without using beacons.

BEST MODE FOR CARRYING OUT THE INVENTION

Now, several embodiments of this invention will be described with reference to the drawings.

Embodiment 1

FIG. 1 is a block diagram showing Embodiment 1 of a drive control apparatus for an electric car according to this invention. The drive control apparatus for the electric car in Embodiment 1 includes the electric car 10 on which a linear induction motor is mounted. This electric car 10 travels on rails which are laid on the ground. This electric car 10 is fed with DC power from a feeder line 1 which is laid over the ground.

The electric car 10 includes the linear induction motor 11, a VVVF inverter 12, notch command means 21 disposed in a driver's cabin, axle rotational-frequency information output means 23, wheel diameter data means 25 disposed in the driver's cabin, and an inverter control unit 30.

The linear induction motor 11 is a linear induction motor of three phases. This linear induction motor 11 is attached to the truck, for example, of the electric car 10 in opposition to a reaction rail laid on the ground, and it drives the electric car 10.

The VVVF inverter 12 is an inverter of variable output voltage type and variable output frequency type, and it is fed with DC power through a DC feeder path 13 from the feeder line 1. A collector shoe 14, a disconnector 15 and a filter reactor 16 are arranged in the DC feeder path 13. The collector shoe 14 slides in touch with the feeder line 1. The VVVF inverter 12 generates a three-phase AC voltage VAC on the basis of the DC power. The three-phase AC voltage VAC is a three-phase AC voltage of U-phase, V-phase and W-phase, and it is fed to the linear induction motor 11 through a three-phase AC feeder path 17. The VVVF inverter 12 is configured using, for example, a plurality of thyristors.

Current detection means 18 is arranged in the three-phase AC feeder path 17. The current detection means 18 is, for example, a transformer coupled to the three-phase AC feeder path 17, and it detects the instantaneous values IU, IV and IW of three-phase AC current which flows from the VVVF inverter 12 to the linear induction motor 11 on the basis of the three-phase AC voltage VAC, so as to generate the instantaneous value information IUVW of the three-phase AC current as represents the instantaneous values IU, IV and IW of this three-phase AC current.

The notch command means 21 is disposed in the driver's cabin of the electric car 10. This notch command means 21 outputs a torque command TO in accordance with the manipulation of the driver of the electric car 10.

The axle rotational-frequency information output means 23 is configured using a pulse generator 24, and it outputs axle rotational-frequency information FR. The pulse generator 24 is disposed at the end part of the axle of the electric car 10, the rotational frequency of which is to be detected, and it generates an output pulse in synchronism with the rotation of the axle to have its rotational frequency detected. Such output pulses of the pulse generator 24 are outputted as the axle rotational-frequency information FR. The axle rotational-frequency information FR represents the rotational frequency Fr of the axle to have its rotational frequency detected, on which the pulse generator 24 is disposed.

The wheel diameter data means 25 is disposed in the driver's cabin of the electric car 10. This wheel diameter data means 25 outputs a wheel diameter data output WD1. This wheel diameter data means 25 includes memory means, and it outputs wheel diameter data Wd1 stored in the memory means, as the wheel diameter data output WD1. The wheel diameter data Wd1 is obtained by measuring the wheel diameter data of a wheel attached to the axle to have its rotational frequency detected, on which the pulse generator 24 is disposed, and then storing the wheel diameter data in the memory means. Concretely, at the routine inspection of the electric car 10, the wheel diameter data of the wheel attached to the axle to have its rotational frequency detected, on which the pulse generator 24 is disposed, is measured, and the measured wheel diameter data is stored in the memory means as the wheel diameter data Wd1. The wheel diameter data Wd1 is corrected each time the electric car 10 undergoes the routine inspection.

The notch command means 21, the axle rotational-frequency information output means 23 and the wheel diameter data means 25 is connected to the inverter control unit 30 by a transmission line 26. The transmission line 26 includes transmission lines 26A, 26B and 26C. The notch command means 21 is connected to the inverter control unit 30 through the transmission line 26A, the axle rotational-frequency information output means 23 is connected through the transmission line 26B, and the wheel diameter data means 25 is connected through the transmission line 26C.

The inverter control unit 30 is configured of, for example, a microcomputer, and it includes three-phase/two-phase conversion means 31, wheel-diameter correction information output means 32, synchronizing-frequency calculation means 37, and inverter control command means 38. The three-phase/two-phase conversion means 31 is configured of, for example, the CPU of the microcomputer. This three-phase/two-phase conversion means 31 receives the instantaneous value information IUVW of the three-phase AC current from the current detection means 18, and it also receives inverter frequency information FINV from the inverter control command means 38. This three-phase/two-phase conversion means 31 converts the instantaneous value information IUVW of the three-phase AC current into two-phase current information Idq by using the inverter frequency information FINV, and it outputs the two-phase current information Idq. The inverter frequency information FINV represents the output frequency Finv of the VVVF inverter 12.

The two-phase current information Idq contains two current components Id and Iq. These current components Id and Iq are current components on phase axes which are orthogonal to each other. The three-phase/two-phase conversion means 31 calculates the current components Id and Iq in conformity with Formulas (1) and (2) given below, and outputs the two-phase current information Idq containing these current components Id and Iq. As seen from Formula (1), the current components Id and Iq are not affected by the wheel diameter. Incidentally, "t" in Formula (2) denotes an elapsed time.

$$\begin{pmatrix} Id \\ Iq \end{pmatrix} = \begin{pmatrix} \cos\theta, \cos(\theta - 2\pi/3), \cos(\theta - 4\pi/3) \\ \sin\theta, \sin(\theta - 2\pi/3), \sin(\theta - 4\pi/3) \end{pmatrix} \begin{pmatrix} IU \\ IV \\ IW \end{pmatrix} \quad (1)$$

$$\theta = 2\pi \times Finv \times t \quad (2)$$

The wheel-diameter correction information output means includes wheel-diameter default information means 33, wheel-diameter calculation means 34 and selection output means 36, and it outputs wheel-diameter correction information WD. The wheel-diameter default information means 33 is configured of, for example, the memory of the microcomputer. This wheel-diameter default information means 33 stores wheel-diameter default data Wd0 therein, and it outputs the wheel-diameter default data Wd0 as wheel-diameter default information WD0. The wheel-diameter default data Wd0 is stored in the memory as the wheel-diameter initial value of the wheel attached to the axle to have its rotational frequency detected, on which the pulse generator 24 is disposed.

The wheel-diameter calculation means 34 is configured of, for example, the CPU of the microcomputer. This wheel-diameter calculation means 34 receives the two-phase current information Idq from the three-phase/two-phase conversion means 31, it receives the wheel-diameter default information WD0 from the wheel-diameter default information means 33, and it receives the inverter frequency information FINV and slip frequency information FS from the inverter control command means 38. The slip frequency information FS represents the slip frequency Fs of the linear induction motor 11. The wheel-diameter calculation means 34 outputs wheel-diameter calculation information WD2 on the basis of the two-phase current information Idq, the wheel-diameter default information WD0, the inverter frequency information FINV and the slip frequency FS. This wheel-diameter calculation means 34 constitutes wheel-diameter correction backup means 35.

The wheel-diameter calculation means 34 calculates wheel-diameter calculation data Wd2 in conformity with Formulas (3) and (4) given below, and it outputs the wheel-diameter calculation data Wd2 as the wheel-diameter calculation information WD2.

$$Wd2 = (Finv - Fs) \times Wd0/Fmp \quad (3)$$

$$Fs = (Iq/Id) \times (R2/L2 \times 2\pi) \quad (4)$$

Here, "Fmp" denotes the synchronizing frequency of the linear induction motor 11 as calculated from the wheel-diameter default value Wd0, "R2" denotes the secondary resistance value of the linear induction motor 11, and "L2" denotes the secondary inductance value of the linear induction motor 11.

The selection output means 36 is configured of, for example, the output unit of the microcomputer. This selection output means 36 includes a first input portion a, a second input portion b, a third input portion c, and an output portion d. The first input portion a receives the wheel-diameter data output WD1 from the wheel-diameter data means 25 through the transmission line 26C. The second input portion b receives the wheel-diameter calculation output WD2 from the wheel-diameter calculation means 34. The third input portion c receives the wheel-diameter default information WD0 from the wheel-diameter default information means 33. The selection output means 36 selects any one of the wheel-diameter data output WD1, the wheel-diameter calculation information WD2 and the wheel-diameter default information WD0, and it outputs the wheel diameter information WD from the output portion d.

The synchronizing-frequency calculation means 37 is configured of, for example, the CPU of the microcomputer. This synchronizing-frequency calculation means 37 receives the axle rotational-frequency information FR from the axle rotational-frequency information output means 23, and it receives the wheel-diameter correction information WD from the wheel-diameter information output means 32. The synchronizing-frequency calculation means 37 calculates the synchronizing frequency Fm of the linear induction motor 11 on the basis of the axle rotational-frequency information FR and the wheel-diameter correction information WD, and it outputs synchronizing frequency information FM representing the synchronizing frequency Fm.

The synchronizing-frequency calculation means 37 calculates the synchronizing frequency Fm in conformity with Formula (5) given below, and it outputs this synchronizing frequency Fm as the synchronizing frequency information FM.

$$Fm = \pi \times Wd \times Fr/2\tau \quad (5)$$

Here, "τ" denotes the polar pitch of the linear induction motor 11.

The inverter control command means 38 is configured of, for example, the CPU of the microcomputer. In Embodiment 1, this inverter control command means 38 is configured using vector calculation control means 39. This vector calculation control means 39 is well-known means. The vector calculation control means 39 receives the torque command TO from the notch command means 21, the two-phase current information Idq from the three-phase/two-phase conversion means 31, and the synchronizing frequency information FM from the synchronizing-frequency calculation means 37, and it generates a control command, concretely, a voltage command VO and a frequency command FO, for the VVVF inverter 12 as is well known. The voltage command VO and the frequency command FO are fed to the VVVF inverter 12 so as to control the output voltage and output frequency of the VVVF inverter 12.

The vector calculation control means 39 simultaneously generates the inverter frequency information FINV and the slip frequency information FS. The inverter frequency information FINV is fed to the three-phase/two-phase conversion means 31 and the wheel-diameter calculation means 34. The slip frequency information FS is fed to the wheel-diameter calculation means 34.

Now, a flow chart of the selection output means 36 is shown in FIG. 2. This flow chart in FIG. 2 contains five steps S11-S15 subsequent to a process start step S10. At the step S11, if the wheel-diameter data output WD1 has been normally received by the selection output means 36 is judged. If the result of the judgment by the step S11 is "YES", the routine proceeds to the step S12, at which the wheel-diameter data output WD1 is selected as the wheel-diameter correction information WD.

If the result of the judgment by the step S11 is "NO", the routine proceeds to the step S13. At this step S13, if a backup requirement is met is judged. If the result of the judgment by the step S13 is "YES", the routine proceeds to the step S14, at which the wheel-diameter calculation output WD2 is selected as the wheel-diameter correction information WD. If the result of the judgment by the step S13 is "NO", the routine proceeds to the step S15, at which the wheel-diameter default information WD0 is selected as the wheel-diameter correction information WD.

The backup requirement at the step S13 is a requirement under which all the following conditions (a), (b) and (c) are satisfied:

(a) The VVVF inverter 12 is in an operating state.

(b) The output frequency Finv of the VVVF inverter 12 is, at least, a predetermined value F1.

(c) The VVVF inverter 12 has operated continuously for, at least, a predetermined time period without any protection operation against the abnormality of the VVVF inverter 12.

In the case where the result of the judgment by the step S11 is "NO" as the judgment that the wheel-diameter monitor output WD1 is not normally received, the wheel-diameter calculation information WD2 is selected at the step S14 when the backup requirement is met, but the wheel-diameter default information WD0 is selected at the step S15 when the backup requirement is not met. The selection output of the wheel-diameter default information WD0 from the step S15 is fed back to the step S13, and in a case where the backup requirement is not met, the wheel-diameter default information WD0 of the step S15 is selected as the wheel-diameter correction information WD as a fail-safe function.

As described above, Embodiment 1 is so configured that the wheel-diameter correction information output means 32 includes the wheel-diameter calculation means 34, and that the wheel-diameter calculation information WD2 of the wheel-diameter calculation means 34 is selected, thereby to output the wheel-diameter correction information WD, and hence, the synchronizing frequency can be corrected without using beacons. Besides, the selection output means 36 selects a state where the wheel-diameter data output WD1 is outputted as the wheel-diameter correction information WD, and a state where the wheel-diameter calculation information WD2 is outputted as the wheel-diameter correction information WD, and hence, the inverter control can be performed by effectively utilizing the wheel-diameter data output WD1 and the wheel-diameter calculation information WD2. Further, the selection output means 36 can select also a state where the wheel-diameter default information WD0 is outputted as the wheel-diameter correction information WD, and hence, when the backup requirement is not met, the inverter control can be performed using the wheel-diameter default information WD0 instead of the wheel-diameter calculation information WD2.

Embodiment 2

FIG. 3 is a block diagram showing Embodiment 2 of the drive control apparatus for the electric car according to this invention. This embodiment 2 uses slip calculation control means 40 instead of the vector calculation control means 39 in Embodiment 1, and inverter control command means 38 is constituted by this slip calculation control means 40. In the other points, Embodiment 2 has the same configuration as that of Embodiment 1.

The slip calculation control means 40 is well-known means. This slip calculation control means 40 is configured so as to receive the instantaneous value IUVW of the three-phase AC current from the current detection means 18, to receive the torque command TO from the notch command means 21, and to receive the synchronizing frequency information FM from the synchronizing-frequency calculation means 37. As is well known, this slip calculation control means 40 calculates the effective value of the three-phase AC current on the basis of the instantaneous value IUVW of the three-phase AC current, and it generates the control command, concretely, the voltage command VO and frequency command FO for the VVVF inverter 12, and also generates the inverter frequency information FINV and slip frequency FS, on the basis of the effective value of the three-phase AC current, the torque command TO and the synchronizing frequency information FM.

Also this embodiment 2 is so configured that the wheel-diameter correction information output means 32 includes the wheel-diameter calculation means 34, and that the wheel-diameter calculation information WD2 of this wheel-diameter calculation means 34 is selected, thereby to output the wheel-diameter correction information WD, and hence, the synchronizing frequency can be corrected without using beacons.

INDUSTRIAL APPLICABILITY

A drive control apparatus for an electric car according to this invention is applied as a drive control apparatus for an electric car wherein a three-phase AC voltage is generated by a VVVF inverter, thereby to drive a linear induction motor.

Figure 1:
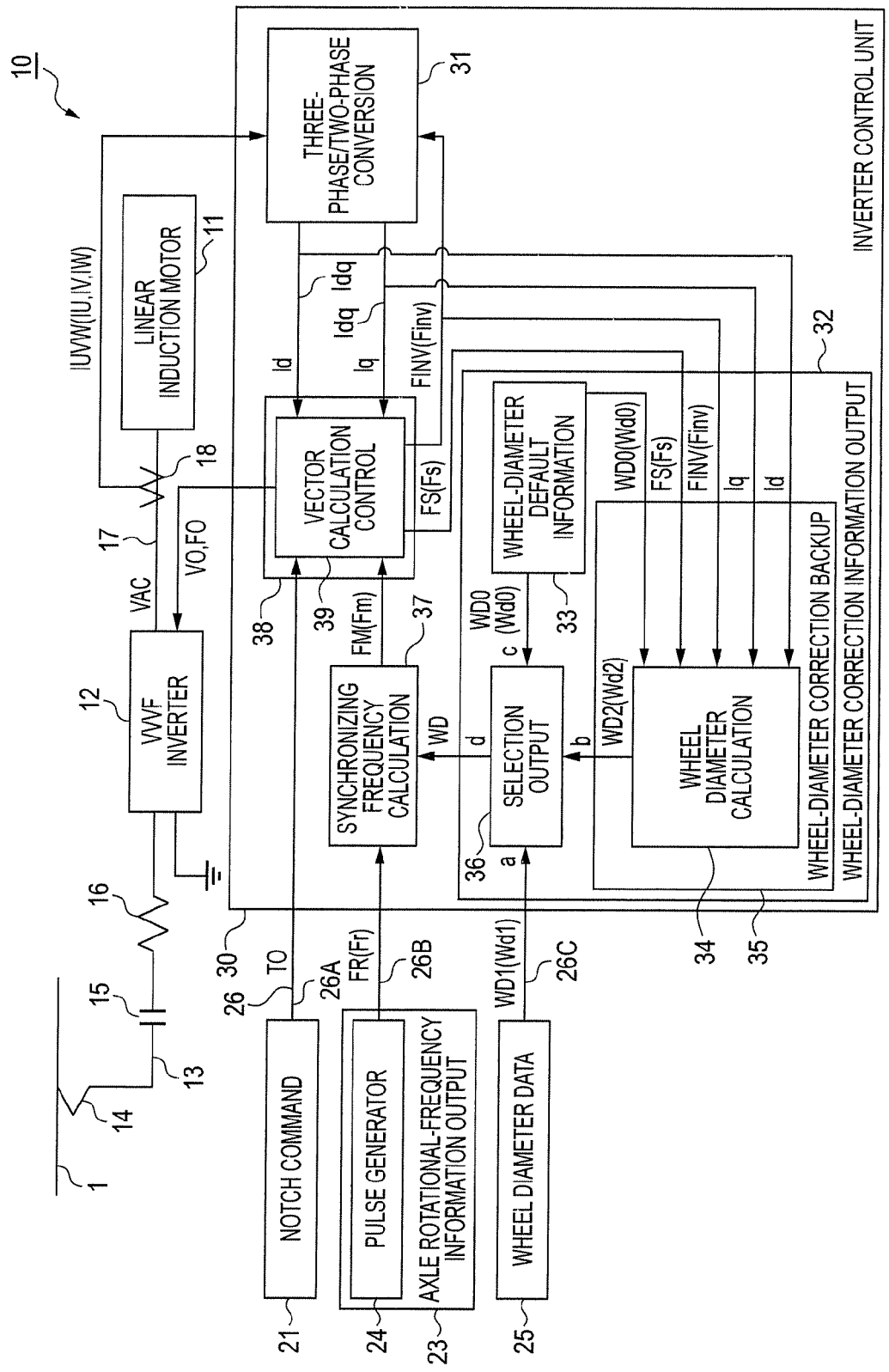
FIG. 1 It is a block diagram showing Embodiment 1 of a drive control apparatus for an electric car according to this invention.
Figure 2:
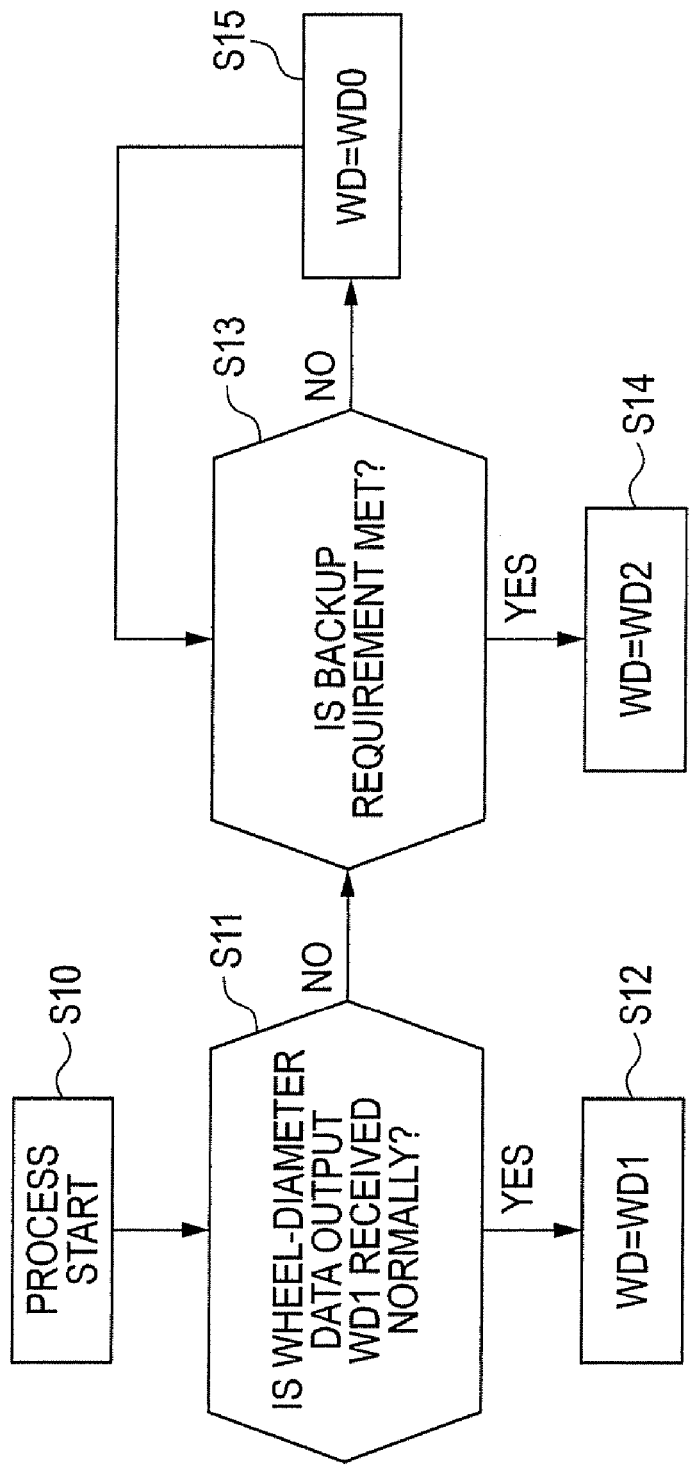
FIG. 2 It is a flow chart of selection output means in Embodiment 1.
Figure 3:
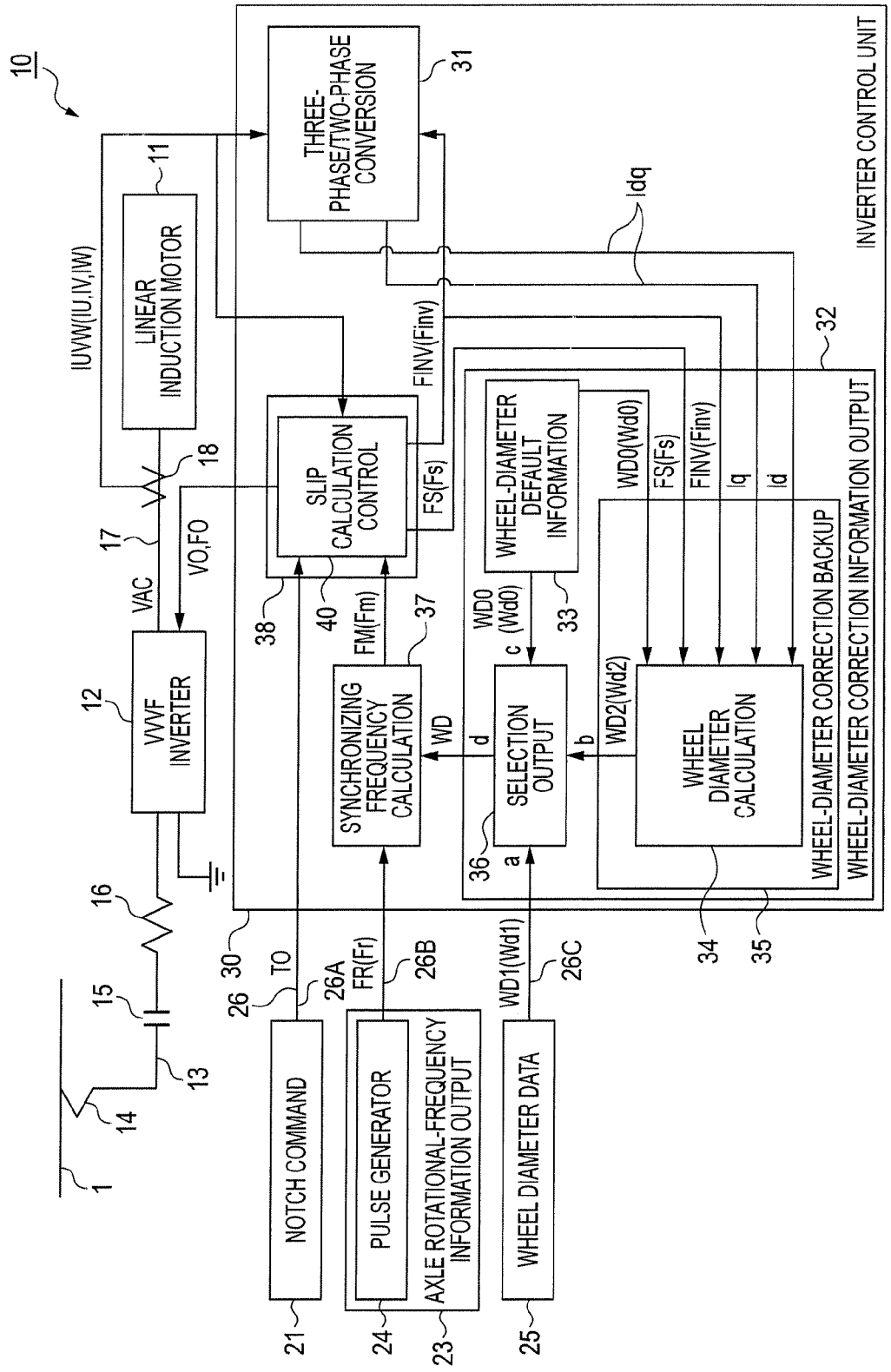
FIG. 3 It is a block diagram showing Embodiment 2 of a drive control apparatus for an electric car according to this invention.

11: linear induction motor,
12: VVVF inverter,
18: current detection means,
21: notch command means,
23: axle rotational-frequency information output means,
25: wheel diameter data means,
31: three-phase/two-phase conversion means,
32: wheel-diameter correction information output means,
33: wheel-diameter default information means,
34: wheel-diameter calculation means,
36: selection output means,
37: synchronizing-frequency calculation means,
38: inverter control command means,
39: vector calculation control means,
40: slip calculation control means

The invention claimed is:

1. A drive control apparatus for an electric car wherein a three-phase AC voltage is generated by a VVVF inverter, and a linear induction motor is driven by the three-phase AC voltage, the drive control apparatus comprising:

current detection means for outputting instantaneous value information of a three-phase AC current which flows from the VVVF inverter to the linear induction motor on the basis of the three-phase AC voltage;

three-phase/two-phase conversion means for converting the instantaneous value information of the three-phase AC current into two-phase current information and outputting the two-phase current information;

axle rotational-frequency information output means for outputting axle rotational-frequency information which represents a rotational frequency of an axle of the electric car;

wheel-diameter correction information output means including wheel-diameter information calculation means for calculating wheel-diameter calculation information representing a wheel diameter of the electric car on the basis of the two-phase current information, and configured so as to be capable of outputting the wheel-diameter calculation information as wheel-diameter correction information;

synchronizing-frequency calculation means for calculating synchronizing frequency information representing a synchronizing frequency of the linear induction motor on the basis of the axle rotational-frequency information and the wheel-diameter correction information; and vector calculation control means for outputting a control command for the VVVF inverter, on the basis of a torque command, the two-phase current information and the synchronizing frequency information.

2. The drive control apparatus for an electric car as defined in claim 1, wherein the wheel-diameter correction information output means further includes selection output means, and the selection output means receives in addition to the wheel-diameter calculation information, a wheel-diameter data output from wheel-diameter data means disposed in a driver's cabin, and it selects either of a state where the wheel-diameter data output is outputted as the wheel-diameter correction information, and a state where the wheel-diameter calculation information is outputted as the wheel-diameter correction information.

3. The drive control apparatus for an electric car as defined in claim 2, wherein the selection output means selects the state where the wheel-diameter data output is outputted as the wheel-diameter correction information, in a case where the wheel-diameter data output has been normally received, whereas it selects the state where the wheel-diameter calculation information is outputted as the wheel-diameter correction information, in a case where the wheel-diameter data output is not normally received.

4. The drive control apparatus for an electric car as defined in claim 3, wherein the selection output means further receives wheel-diameter default information, and it selects the state where the wheel-diameter calculation information is outputted as the wheel-diameter correction information, when a predetermined requirement has been met in the case where the wheel-diameter data output is not normally received, whereas it selects a state where the wheel-diameter default information is outputted as the wheel-diameter correction information, when the predetermined requirement is not met.

* * * * *